April 8, 1958 — P. J. DIELENTHEIS — 2,829,606

DOUGH MOULDING MACHINE

Filed Feb. 25, 1954 — 2 Sheets-Sheet 1

INVENTOR
PETER J. DIELENTHEIS
BY John E. Stryker
ATTORNEY

April 8, 1958 P. J. DIELENTHEIS 2,829,606
DOUGH MOULDING MACHINE
Filed Feb. 25, 1954 2 Sheets-Sheet 2
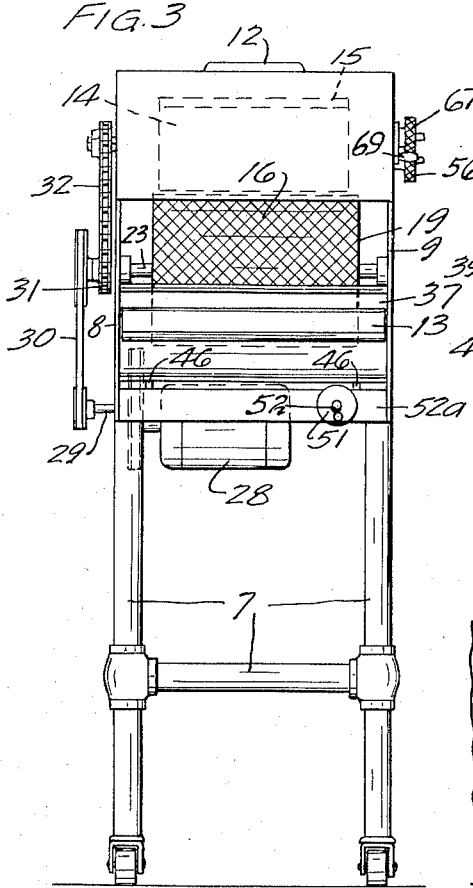
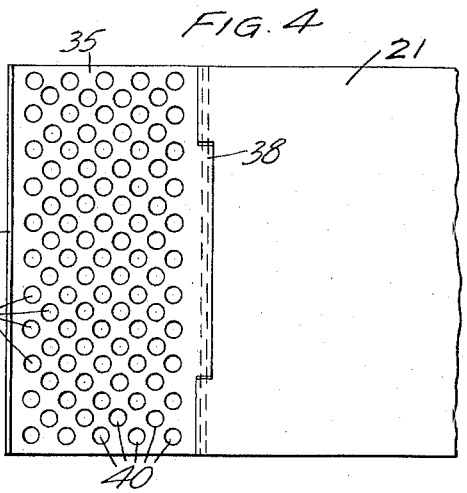
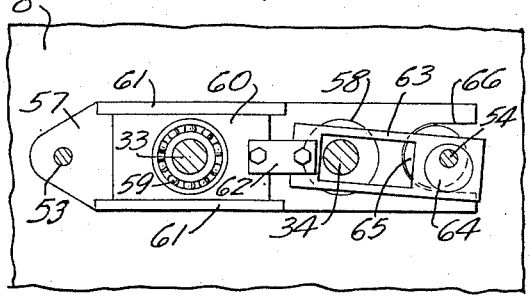
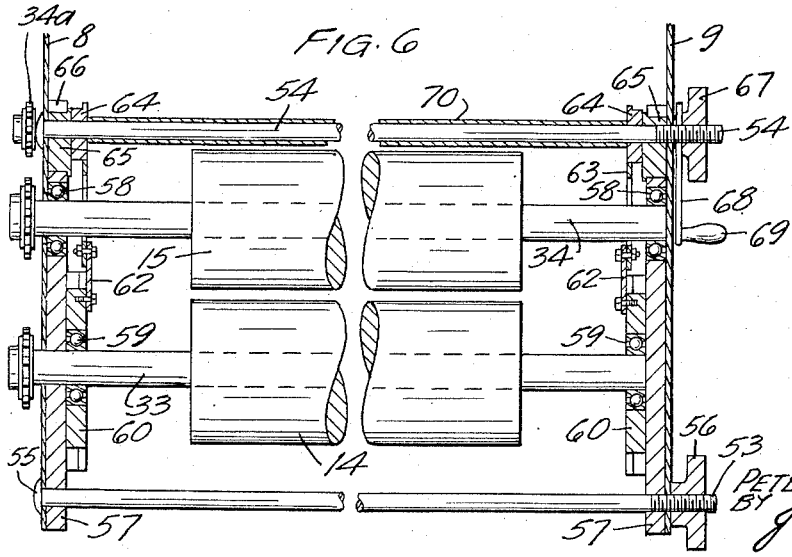
INVENTOR
PETER J. DIELENTHEIS
BY John E. Stryker
ATTORNEY 2,829,606

DOUGH MOULDING MACHINE

Peter J. Dielentheis, Stillwater, Minn.

Application February 25, 1954, Serial No. 412,505

5 Claims. (Cl. 107—9)

This invention relates to improvements in dough moulding machines adapted to receive a succession of pieces of dough of predetermined weight and to roll, compress and form each piece, as required, in preparation for baking.

The principal object of my invention is to provide a novel machine of the class described which is particularly adapted for use in small bakeries by reason of its simplicity and unusually compact arrangement, requiring only a single attendant for the feeding of the dough to the machine and removal of the moulded pieces from the machine to pans ready for baking.

A further object is to provide an improved arrangement of sheeting rollers, conveyor and coacting pressure plates whereby the pressure moulding treatment may be prolonged under accurate control with a view to obtaining bakery products of uniformly high quality.

Other objects are to provide novel control mechanisms for the spacing of the sheeting rollers, one from the other, and in relation to the dough conveyor and also for the spacing of the pressure plates relative to the dough conveyor whereby adjustment of the machine to adapt it for the moulding of pieces of a wide range of shapes and sizes may be accomplished quickly and easily.

The invention also includes certain other novel features of construction which will be more fully pointed out in the following specification and claims.

Referring to the accompanying drawings which illustrate, by way of example, a preferred embodiment of my improved machine:

Fig. 3 is an end view of the machine;

Fig. 4 is a fragmentary top plan view showing particularly the dough curling plate and adjacent portion of the upper pressure plate;

Fig. 5 is a part sectional view and part detail elevational view showing the mechanism for adjusting the positions of the sheeting rollers, and Fig. 6 is a fragmentary sectional view taken on the line 6—6 of Fig. 2, showing the mechanism for supporting and adjusting the positions of the sheeting rollers.

Figure 1:
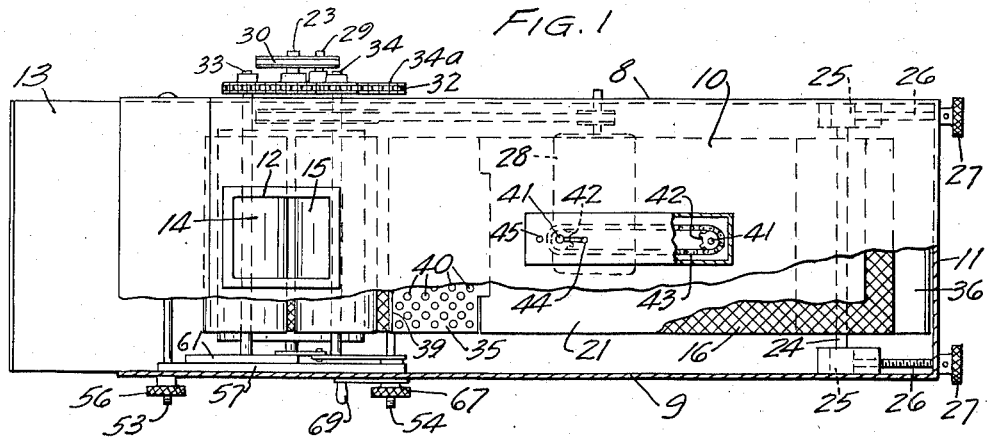
Figure 1 is a top plan view of the same with a portion of the casing and other parts broken away to show parts otherwise concealed.

In the drawings the numeral 7 indicates a suitable supporting base or stand for the machine. Rigidly mounted on this stand is a casing having parallel side walls 8 and 9, a top wall 10 and an end wall 11. Near one end of the machine a hopper 12 is provided to receive pieces of dough of predetermined size to be moulded, and projecting from the same end is a tray 13 upon which the moulded pieces of dough are delivered. By this arrangement of receiving hopper and delivery tray, I make it possible for a single operator stationed near one end of the machine to attend to both the feeding of the machine and removal of the moulded dough therefrom.

A pair of dough sheeting rollers, indicated generally by the numerals 14 and 15, extend horizontally at opposite sides of the hopper 12 and are spaced apart one from the other at their peripheries to form the dough into sheets and to deliver the sheeted dough to the upper reach of an endless belt conveyor 16. This conveyor has substantially horizontally extending, elongated upper and lower reaches indicated by the numerals 17 and 18 respectively and is trained on rollers 19 and 20. An upper pressure plate 21 is supported above the reach 17 in spaced, substantially parallel, relation thereto and a lower pressure plate 22 is supported below the lower reach 18 in similarly spaced substantially parallel relation. The roller 19 is fixed on a driven shaft 23 and the latter has suitable bearings mounted on the walls 8 and 9. An axially disposed shaft 24 is provided to support the roller 20 and this shaft is supported in adjustable bearings 25 which are operatively connected to screw shafts 26 having knobs 27 adapted to be turned manually to apply suitable tension to the conveyor belt 17.

Power for operating the machine is furnished by means of an electric motor 28 which is connected through suitable speed reduction gearing including a shaft 29 and belt 30 to a pulley fixed on the shaft 23 for driving the conveyor belt 16. Also fixed on the shaft 23 is a sprocket wheel 31 upon which is trained a chain 32 arranged to drive sprocket wheels fixed on shafts 33 and 34 carrying the sheeting rollers 14 and 15 respectively. An idler sprocket wheel 34a is arranged to guide the chain 32 from the lower periphery of the wheel driving the shaft 34 to the sprocket wheel 31.

By this driving mechanism the sheeting rollers are caused to feed masses of dough from the hopper 12 to the upper reach 17 of the conveyor belt and the belt is continuously operated to carry dough masses first beneath a curling plate 35 where the sheet is rolled or curled and then beneath the pressure plate 21. From the trailing end of the reach 17 the dough masses are carried under the guidance of a curved plate 36 to the lower pressure plate 22. This plate confines the dough masses in rolling contact with the lower reach 18 of the belt which finally delivers the molded masses upon a curved delivery plate 37 to the tray 13.

As best shown in Fig. 4, the curling plate 35 has a hinge connection 38 with an end of the pressure plate 21 and the opposite end of the plate 35 is formed with an upwardly curved flange 39 which is slidably supported on the sheeted dough masses carried by the conveyor reach 17. The plate 35 is preferably formed with a multiplicity of apertures 40 of suitable size adapted to increase the friction between the plate and sheeted dough and thereby retard the upper side of the dough while the conveyor belt carries the lower side of the mass along its path of travel, thereby insuring the formation of each sheeted piece of dough into a curled mass preparatory to the kneading and moulding between the moving conveyor belt surface and the stationary surfaces of the plates 21, 22, 36 and 37.

Figure 2:
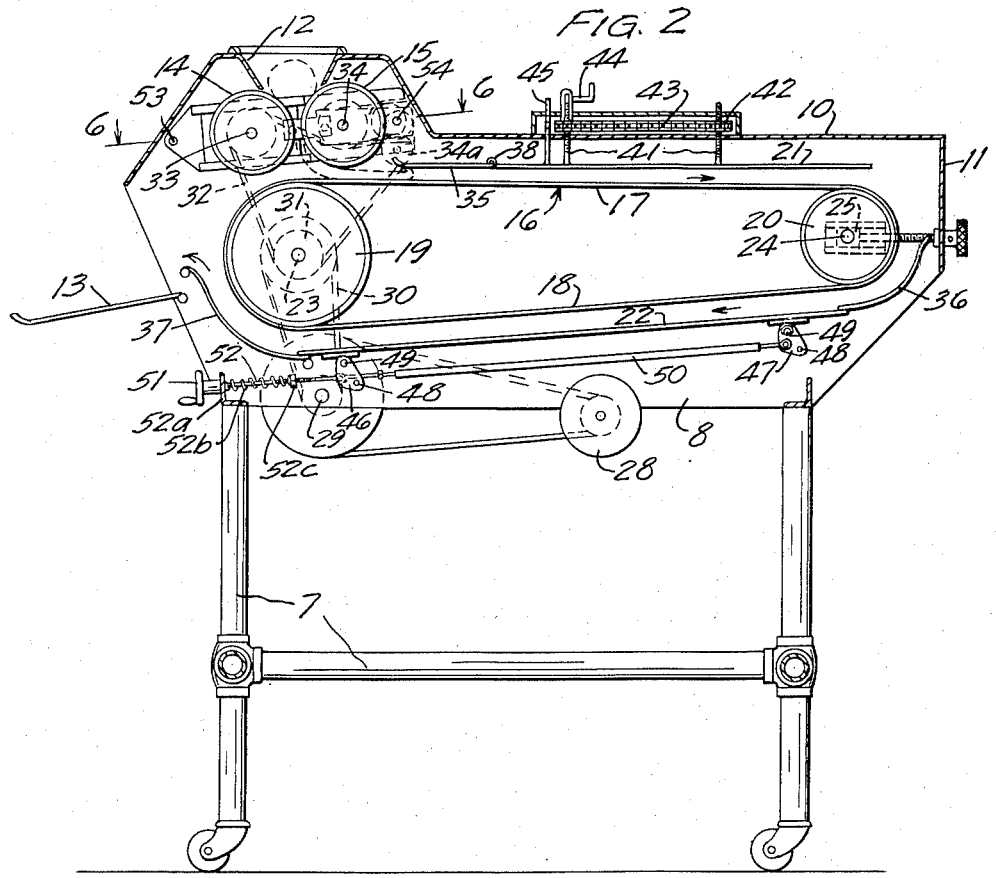
Fig. 2 is a part side elevational and part sectional view of the same with one side wall of the casing removed.

As shown in Figs. 1 and 2, the upper pressure plate 21 is supported on a pair of substantially vertically disposed threaded rods 41. These rods are movable vertically in bearings in the top wall 10 of the casing and each has a threaded connection with a small sprocket wheel 42. Trained on the sprocket wheels 42 is an endless chain 43 adapted to turn the sprocket wheels in unison. To actuate the chain 43 and thereby raise or lower the rods 41 carrying the plate 21, one of the sprocket wheels 42 is provided with a manually operable crank 44 having a hollow hub to receive the projecting end portion of the threaded rod 41. A gauge rod 45 is arranged to project upward from the plate 21 to the exterior of the casing and is graduated to indicate the elevation of the plate 21 relative to the upper reach 17 of the conveyor belt.

As further shown in Figs. 1 and 2, the spacing of the lower pressure plate 22 relative to the lower belt reach 18 is made readily adjustable by supporting mechanism which includes pairs of members 46 and 47 each pivotally supported on a pin 48 and operatively connected by a pin 49 with the plate 22. The pairs of members 46 and 47 are connected together for tilting movement in unison by a pair of rods 50 and a manually operable head 51 is threaded on a shaft 52 which is operatively connected to the rods 50. A bracket 52a affords a bearing for the shaft 52 and the head 51 abuts against one side of this bracket. Coiled about the shaft 52 at the opposite side of the bracket 52a is a spring 52b which is confined on the shaft and held under compression by a nut 52c threaded on the shaft. This spring resiliently supports the members 46 and 47 in selected inclined positions so that the pressure plate 22 applies yielding pressure to the dough masses as they are carried along by the lower belt reach. The curved plates 36 and 37 are connected to the plate 22 so that all of these plates may be moved up and down in unison and resiliently supported in variously spaced relation to the dough conveyor.

To facilitate adjustment of the spacing of the sheeting rollers 33 and 34, one relative to the other, and also in relation to the upper surface of the reach 17, I provide the mechanism which is shown in detail in Figs. 5 and 6. This mechanism includes parallel shafts 53 and 54. The shaft 53 has a fixed head 55 on one end for engagement with the outer surface of the casing wall 10 and carries a knob 56 in threaded engagement with the other end for contact with the outer surface of the wall 9. Pivoted on the shaft 53 adjacent to the inner surfaces of the walls 9 and 10 are arms 57 which support the bearings for the sheeting roller shafts 33 and 34. Bearings 58 for the shaft 34 are supported in recesses in the arms 57 and bearings 59 for the shaft 33 are carried by bearing blocks 60 which are movable longitudinally of the arms 57 between parallel guides 61 mounted thereon.

Each of the blocks 60 is operatively connected by a link 62 to a yoke 63 which straddles the shaft 34 and is fitted with an eccentric 64 fixed on the shaft 54. A second eccentric 65 is fixed on the shaft 54 at each side of the machine for imparting oscillating movement to the arms 57 about the shaft 53 as a pivot. A U-shaped bearing 66 is formed in an end of the arm 57 for engagement with the eccentric 65 so that when this eccentric is rotated from the position shown in Fig. 5, the adjoining end of the arm 57 is moved either up or down, depending on the direction of rotation. When the eccentric 64 is turned from the position shown in Fig. 5, the shaft 33 carrying the sheeting roller 14 is moved either toward or away from the roller 15, depending upon the direction of the turn. Since the pairs of eccentrics 64 and 65 are fixed on the shaft 54, the required adjustments of the sheeting rollers may be accomplished by merely turning the shaft 54 about its axis.

As indicated in Figs. 1 and 6, a threaded end portion of the shaft 54 is fitted with a manually operable clamp knob 67 and fixed on the shaft 54 adjacent to the knob 67 is an arm 68 having a handle 69 adapted to be manipulated to turn the shaft about its axis. A tubular clamp member 70 embraces the shaft 54 and has its ends positioned for engagement with the inner surfaces of the cams 64. To free the shaft 54 for turning movement, the knob 67 is loosened, whereupon the eccentrics 64 and 65 may be turned to proper position by adjustment of the position of the arm 68 and the knob 67 may be tightened to securely hold the eccentrics in adjusted position.

It will thus be evident that by simple manipulation of the knob 67 and handle 69 the spacing of the sheeting rollers 14 and 15 one from the other may be changed to regulate the thickness of the sheet of dough which is formed between them, and at the same time the spacing of the sheeting roller 15 from the endless belt conveyor may be adjusted as required to mold dough masses of selected sizes within a wide range of sizes.

In Fig. 5 the eccentrics 64 and 65 and other parts including shaft 54 are shown in an intermediate position. Thus by turning the shaft 54 clockwise from this position the spacing of the sheeting rollers, one from the other, is increased and the roller carried by the shaft 34 is moved away from the conveyor belt. Adjustment in the reverse direction is accomplished by rotation of the shaft 54 counter-clockwise.

With the machine in operation and properly adjusted for a particular bakery product, the operator feeds a succession of pieces of dough of the required size into the hopper 12 with the result that a succession of sheets of dough of the required thickness are fed from the sheeting rollers 14—15 to the upper surface of the conveyor belt reach 17 and are carried, successively, by the conveyor first beneath the flanged end of the curling plate 35 where a roll or curl is formed from each piece. Thereupon each rolled mass is compressed and elongated as it is carried along beneath the plate 21 from which it passes to the plate 36 and is carried by the conveyor in rolling contact with the lower pressure plate 22 and up the incline of the plate 37, to be finally discharged upon the tray 13 as a molded unit of the required consistency. The pressure exerted by the upper plate may be adjusted quickly and easily by operation of the crank 44, reference being made to the gauge rod 45 indicating the elevation of the plate 21. The further adjustment required for the proper spacing of the plates 22, 36 and 37 relative to the lower reach of the conveyor may also be made quickly and easily by turning the head 51 on the threaded shaft 52 in the appropriate direction. Both the feeding of the measured pieces of dough to the hopper 12 and the removal of the molded units from the tray 13 may be accomplished by a single attendant rapidly and with a minimum of work.

I claim:

1. In a dough molding machine having a frame and endless conveyor belt, improved means for controlling the thickness of the sheet of dough fed to said belt comprising, substantially horizontally spaced dough sheeting rollers disposed to coact one with the other in forming a sheet of dough and feeding it to said conveyor belt, one of said rollers being disposed to coact with the upper surface of said belt in compressing the sheet of dough thereon, axially disposed shafts for rotating and supporting said rollers respectively, supporting means for said shafts on said frame, said supporting means for the respective shafts being relatively movable one to and from the other, and at least one of said shaft supporting means being movable to and from the upper reach of said conveyor, a third shaft extending in substantially parallel relation to the shafts supporting said rollers, pairs of eccentric members fixed on said third shaft, means operatively connecting said shaft supporting means to said eccentric members to impart movement to the supporting means for adjusting the spacing of said rollers one relative to the other and for adjusting the spacing of one of them relative to the conveyor when said third shaft is turned about its axis, manually operable means for turning said third shaft about its axis and means for securing said third shaft in adjusted positions.

2. In a dough moulding machine having a frame and an endless conveyor belt, improved means for controlling the thickness of the sheet of dough fed to said belt comprising, substantially horizontally spaced dough sheeting rollers disposed to coact one with the other in forming a sheet of dough and feeding it to said conveyor belt, one of said rollers being disposed to coact with the upper surface of said belt in compressing the sheet of dough thereon, axially disposed shafts for rotating and supporting said rollers respectively, supporting means for said shafts on said frame, said supporting means for the respective shafts being relatively movable, one to and from the other, and at least one of said shaft supporting means being movable to and from the upper surface of said conveyor, means operatively connecting the supporting means for one of said shafts to the supporting means for the other shaft and manually operable means for actuating the supporting means for the respective shafts to change the spacing of said rollers one relative to the other and to change the spacing of one of said rollers relative to the conveyor belt.

3. In a dough moulding machine having a frame and an endless conveyor belt, improved means for controlling the thickness of the sheet of dough fed to said belt comprising, substantially horizontally spaced dough sheeting rollers disposed to coact one with the other in forming a sheet of dough and feeding it to said conveyor belt, one of said rollers being disposed to coact with the upper surface of said belt in compressing the sheet of dough thereon, axially disposed shafts for rotating and supporting said rollers respectively, a common bearing support for both of said shafts movably connected to said frame, supporting means for each of said shafts carried by said common bearing support, the supporting means for one of said shafts being movable on the common bearing support to and from the other bearing support carried thereby, said common bearing support being movable to and from the upper surface of said conveyor and manually operable means for actuating the supporting means for one of said shafts to change the spacing of said rollers one relative to the other and for actuating the common bearing support to change the spacing of one of said rollers relative to the conveyor belt.

4. In a dough moulding machine having a frame, an endless conveyor and a pressure plate disposed to compress curled sheets of dough on said conveyor, the improvements which comprise, a dough curling plate extending above the trailing end portion of said conveyor to engage and curl sheeted pieces of dough carried by said conveyor, means hingedly supporting said plate along its leading edge on the trailing edge of said pressure plate, the trailing edge of said curling plate being free to oscillate to and from said conveyor, a member projecting obliquely upward and rearward along the free edge of said curling plate whereby said plate is adapted to be raised by sliding engagement with the leading edge of a flat sheet of dough, said curling plate being held by gravity in frictional contact with the sheeted dough carried by the conveyor, whereby to curl a flat sheet of dough to be compressed and rolled between the conveyor and pressure plate.

5. A dough moulding machine in accordance with claim 4 wherein said dough curling plate is formed with a multiplicity of apertures to increase the friction between the plate and the curl of dough.

References Cited in the file of this patent

UNITED STATES PATENTS

| | | |
|---|---|---|
| Re. 11,751 | Corby et al. | June 20, 1899 |
| Re. 18,545 | Sternberg | July 26, 1932 |
| 871,644 | Smith | Nov. 19, 1907 |
| 889,465 | Keller et al. | June 2, 1908 |
| 1,216,512 | Streich | Feb. 20, 1917 |
| 1,366,266 | Lauterbur | Jan. 18, 1921 |
| 1,420,486 | Kennedy | June 20, 1922 |
| 1,796,922 | Eseman | Mar. 17, 1931 |
| 2,615,404 | Crosland | Oct. 28, 1952 |

FOREIGN PATENTS

| | | |
|---|---|---|
| 417,852 | Great Britain | Oct. 15, 1934 |